United States Patent [19]

Nikles et al.

[11] Patent Number: 4,783,386

[45] Date of Patent: Nov. 8, 1988

[54] USE OF ANTHRACYANINE AND PHENANTHRACYANINE CHROMOPHORES IN OPTICAL INFORMATION MEDIA

[75] Inventors: David E. Nikles, Colonia; R. Sidney Jones, Jr., Randolph; James E. Kuder, Fanwood, all of N.J.

[73] Assignee: Hoechst Celanese Corporation, Somerville, N.J.

[21] Appl. No.: 2,345

[22] Filed: Jan. 12, 1987

[51] Int. Cl.$^4$ .................... G03C 3/66; G03C 1/72; G11B 7/24

[52] U.S. Cl. ..................... 430/19; 430/945; 430/944; 430/495; 430/906; 430/21; 430/270; 540/122; 540/129; 540/130; 540/123; 540/140; 540/133; 540/128; 540/139; 346/135.1; 346/76 L; 369/284; 369/94; 428/69

[58] Field of Search ............... 430/945, 944, 495, 906, 430/19, 21; 540/122, 129, 130, 123, 140, 133, 128, 139; 346/135.1, 76 L; 369/284, 94; 428/69

[56] References Cited

U.S. PATENT DOCUMENTS

| | | | |
|---|---|---|---|
| 4,241,355 | 12/1980 | Bloom et al. | 346/76 L |
| 4,478,782 | 10/1984 | Kuder et al. | 430/945 X |
| 4,492,750 | 1/1985 | Law et al. | 430/495 |

FOREIGN PATENT DOCUMENTS

| | | | |
|---|---|---|---|
| 0011292 | 1/1984 | Japan | 430/945 |
| 0067093 | 4/1984 | Japan | 430/945 |
| 60-184565 | 9/1985 | Japan . | |
| 1167690 | 7/1986 | Japan | 540/122 |
| 61-163891 | 7/1986 | Japan . | |
| 61-163892 | 7/1986 | Japan . | |
| 61-186384 | 8/1986 | Japan . | |
| 1290922 | 9/1972 | United Kingdom . | |

OTHER PUBLICATIONS

E. V. Blackburn et al., "Preparation and Photochemistry of Some Tetra Zaporphins", Journal of Chemical Society (C), London, 1970, pp. 175-178.

*Primary Examiner*—Paul R. Michl
*Assistant Examiner*—Cynthia Hamilton
*Attorney, Agent, or Firm*—Burns, Doane, Swecker & Mathis

[57] ABSTRACT

Provided is an optical information recording medium and a method of recording information thereon. The information layer of the recording medium comprises an anthracyanine or phenanthracyanine chromophore compound. In a preferred embodiment, the chromophore is substituted with at least one substituent conferring film forming properties to the chromophore, e.g., a monomer or oligomeric substituent comprised of acid, amide or ester units. The resulting information layer exhibits strong absorption in the range of from about 780-850 nm. Employing an anthracyanine or phenanthracyanine chromophore substituted with a film forming substituent further offers the advantages of a single component material exhibiting good thermomechanical properties.

34 Claims, No Drawings

USE OF ANTHRACYANINE AND PHENANTHRACYANINE CHROMOPHORES IN OPTICAL INFORMATION MEDIA

BACKGROUND OF THE INVENTION

1. Field of the Invention

The present invention relates to a novel optical recording medium and the recording of information thereon. More particularly, the present invention relates to an optical information recording medium, preferably in the form of a disk or in a tape format, suitable for use with optical recording and playback apparatus. The present invention also relates to such optical information media wherein the information layer is comprised of a near-infrared absorbing chromophore.

2. Description of the Prior Art

Optical recording methods in which light from a laser is focused upon the surface of a recording medium with sufficient intensity to cause a detectable change in the physical characteristics of the surface material have been proposed. Among these methods is the establishment of an information pattern of deformations. In such methods, the information representative pattern of deformations may be formed in the surface of the recording medium by suitably controlling the intensity of the focused light in accordance with the information to be recorded while relative motion is established between the recording medium and the focused light spot.

The recording medium, of course, is one of the key elements in any optical information storage system. The commercial viability of the recording medium depends upon such technical parameters as the sharpness in recording and playback of the information, i.e., a high signal to noise ratio. Dyes and pigments have accordingly been employed in information layers, often to enhance the sensitivity of the recording layers at the particular wavelength of the laser being used, which results in a sharper recording and hence playback of the information.

For example, Spong, U.S. Pat. No. 4,097,895, describes a recording medium which comprises a light reflecting material, such as aluminum or gold, coated with a dye-containing light absorbing layer, such as fluorescein, which is operative with an argon laser light source. The thickness of the light absorbing layer is chosen so that the structure has minimum reflectivity. An incident light beam then ablates, vaporizes or melts the dye-containing light absorbing layer, leaving a hole and exposing the light reflecting layer. After recording at the wavelength of the recording light, maximum contrast between the minimum reflectance of the light absorbing layer and the reflectance of the light reflecting layer exists.

Other U.S. patents which disclose the use of a light absorbing dye in the recording layer include U.S. Pat. Nos. 4,412,231 and 4,446,223. The former patent discloses using a mixture of dyes having different light absorbing wavelengths so that the resulting recording layer has a light absorptivity of or more at all the wavelengths in the range of from 400–900 nm. The latter patent discloses an optical information recording element comprising a support coated with a layer of an amorphous composition, which composition comprises a binder and an oxoindolizine or oxoindolizinium dye.

In a paper entitled "Single Wavelength Optical Recording in Pure, Solvent Coated Infrared Dye Layers" by Gravesteijn, Steenbergen and van der Veen, experiments on the use of certain dyes for optical recording for digital and video applications at GaAlAs laser wavelengths are reported. The paper was presented at the Proceeding of the SPIE, "Optical Storage Media", volume 420, June 6–10, 1983. The specific dyes discussed in the paper are squarylium dyes and pentamethine dyes. It is further suggested in the pape that the solubility of the squarylium dyes in organic solvents can be greatly increased by the introduction of t-butyl groups into thiopyrylium end groups.

The use of dyes in conjunction with optical recording media comprising a styrene oligomer is disclosed in the article by Kuroiwa et al appearing in the *Japanese Journal of Applied Physics.* Vol. 22, No. 2, February, 1983, pp. 340–343. Among the dyes and pigments discussed as being useful is a copper phthalocyanine pigment. Phase separation and incompatibility between the dyes and oligomers were noted in the article as being problems in the use of dyes for optical information media.

Other patents which disclose the use of phthalocyanine compounds in optical recording media include U.S. Patent No. 4,241,355. Described therein is a recording medium comprising a light reflecting layer and a light absorbing layer, which layer absorbs light at from about 750 to 850 nanometers. The absorbing layer is comprised of a phthalocyanine pigment, which can be substituted with a chlorine atom and where the central atom is selected from the group consisting of lead, aluminum, vanadyl, or tin. Example of specific pigments disclosed for use in the recording medium described include lead phthalocyanine, chloroaluminumphthalocyanine, vanadyl phthalocyanine, stannic phthalocyanine, or chloroaluminum chlorophthalocyanine. According to the disclosure of this patent, these phthalocyanine compounds all absorb energy at solid state injection laser wavelengths and thus all can be evaporated onto a light reflecting layer to produce smooth, optical quality light absorption layers that form recorded information having high signal-to-noise ratios. The optical recording media disclosed in this patent were prepared by placing a reflective substrate in a vacuum chamber and causing, for example, the phthalocyanine, such as lead phthalocyanine, to be vacuum evaporated thereon. Note also U.S. Patent No. 4,340,959.

There is described in U.S. Patent No. 4,298,971 an optical recording medium wherein the recording layer consists entirely, or uubstantially entirely, of a compound of a metal oxide, or metal halide phthalocyanine, vacuum vapor deposited onto a substrate with or without a thin film of chalcogenide of tellurium. Examples of suitable phthalocyanines disclosed include vanadyl phthalocyanine, tin phthalocyanine, nickel phthalocyanine, aluminum phthalocyanine, zinc phthalocyanine, platinum phthalocyanine, and the like.

U.S. Patent No. 4,458,004 discloses an optical information recording medium comprising a base and a recording layer formed on the base. The recording layer comprises a fluorine phthalocyanine capable of absorbing light with a wavelength of 700 nm or more. The fluorine phthalocyanine is substituted by at least one fluorine atom on its aromatic rings, and the central group of the compound is selected from the group consisting of hydrogen, a metal, a metal oxide and a metal halide.

Disclosed in U.S. Pat. No. 4,492,750 is an ablative infrared sensitive optical recording composition containing as a component thereof a dispersion of a resinous binder and a soluble naphthalocyanine substituted on its aromatic rings with hydrogen or alkyl groups containing from 4 to about 8 carbon atoms. The central group of the naphthalocyanine compound is two hydrogen atoms, a divalent, trivalent or tetravalent metal complex.

U.S. Pat. No. 4,529,688 discloses an infrared sensitive optical recording composition containing as a component thereof a dispersion of a resinous binder and an absorbing infra-red sensitive tertiary butyl substituted vanadyl phthalocyanine obtained by the vapor treatment of a non-infrared sensitive tertiary butyl substituted vanadyl phthalocyanine of a specified structural formula.

While the foregoing patents disclose many different dyes useful in optical recording, there still remains a need for chromophores which are strong, effective absorbers in the near-infrared regions, i.e., at wavelengths longer than the effective absorption range of phthalocyanines and naphthalocyanines. In particular, compounds showing strong absorption in the range of from 820-830 nm are greatly desired.

Moreover, while dyes or pigments have been employed in the information storage layers of optical recording media due to their excellent absorption properties, problems are still encountered with regard to the application of the dyes or pigments as a stable layer. The addition of dyes to film-forming polymers due to limited solubility of the dye in the polymer and the tendency of the dye/polymer mixture to phase separate over time are severe problems which need to be overcome. The search for an improved information storage medium comprising a dye or pigment overcoming the aforementioned problems is continuously ongoing. What is desired is a recording layer material which of course exhibits a high extinction coefficient, but which also exhibits excellent film-forming properties to enhance its coating applicability, and good solubility in solvents for ease of manipulation. A recording medium which further eliminates the problem of phase separation over time would also be most desirable. Thus, providing a chromophore which absorbs strongly at a desired wavelength is solving only half the problem. Such a compound would not be commercially viable if it suffers from all of the foregoing problems. Excellent stability with respect to thermal actinic and oxidative degradation is also a desirable and necessary feature.

Accordingly, it is an object of the present invention to provide an optical recording medium containing an anthracyanine or phenanthracyanine compound in the recording layer, thereby rendering the recording layer extremely absorptive at wavelengths ranging from 780 to 850 nm.

It is another object of the present invention to provide an optical recording medium employing an anthracyanine or phenanthracyanine chromophore composition which also exhibits good thermomechanical and film forming properties.

It is yet another object of the present invention to provide a novel optical recording medium which allows for ready application of the chromophore to form a stable information layer, while still exhibiting excellent absorption properties in the near-infrared region.

Still another object of the present invention is to provide a novel optical recording medium which contains a chromophore in the information layer, for which the problem of phase separation over time frequently encountered in dye/polymer mixtures is eliminated.

Yet another object of the present invention is to provide a one-component material for use in an information layer of an optical recording medium which exhibits strong film-forming and thermomechanical properties, and excellent absorption properties in the near-infrared region.

These and other objects, as well as the scope, nature and utilization of the invention, will be apparent to those skilled in the art from the following description and the appended claims.

SUMMARY OF THE INVENTION

In accordance with the foregoing objectives, provided herewith is a medium for storage of optical information, i.e., information recorded and played back by optical means, which medium has a recording layer comprised of an anthracyanine and/or phenanthracyanine chromophore, thereby rendering the recording layer extremely absorptive in the wavelength range of from 780 nm to 850 nm, and most particularly 820 nm to 830 nm. In a preferred embodiment, the chromophore is substituted with at least one, but preferably more than one, moiety or substituent conferring film forming properties. The film conferring substituent is preferably that of a monomer or an oligomer, most preferably comprising acid, amide or ester units.

In a most preferred embodiment, the medium for storage of optical information is in the form of a disk.

In another embodiment of the present invention, there is provided a method of recording information in a thin film deposited on a relatively thick substrate by irradiating the film with a laser beam in accordance with said information to form deformations in the film, the improvement comprising said film being comprised of an anthracyanine or phenanthracyanine chromophore.

In another embodiment, there is provided by the present invention a readable information medium comprising a relatively thick and thermally stable substrate having coated thereon a layer comprising an information track comprised of a succession of spaced deformations, said layer being comprised of an anthracyanine or phenanthracyanine chromophore.

DETAILED DESCRIPTION OF THE PREFERRED EMBODIMENTS

The chromophore compound of which the information layer of the recording medium is comprised is an anthracyanine chromophore of the following structural formula:

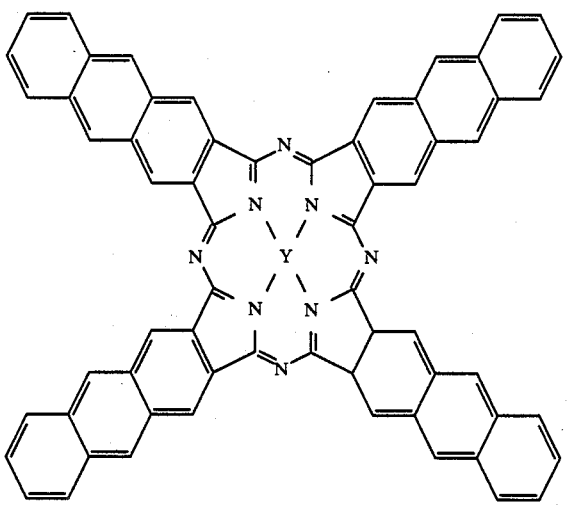

or a phenanthracyanine chromophore of the following structural formula:

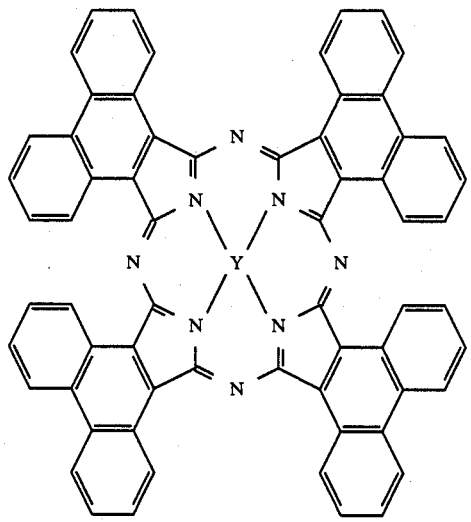

In the foregoing chromophores, Y is a central hetero atom which may be Si, Ge, Sn, a transition metal, Al, Ga, In, an element of Group IIa, IIb or IVb of the Periodic Table or two central hydrogen atoms or isotopes of hydrogen. Mixtures of the foregoing chromophores can also be employed.

It has been found that such chromophores as utilized in the present invention exhibit absorption maxima at longer wavelengths than those generally seen with phthalocyanine and naphthalocyanine compounds. In particular, the anthracyanine and phenanthracyanine chromophores of the present invention exhibit a strong absorption at wavelengths in the range of from about 780–850 nm, and most particularly 820–830 nm. Thus, optical recording media employing the chromophores of the present invention are suitable for use in systems using lasers such as the solid state injection lasers, e.g., AlGaAs lasers.

The anthracyanines and phenanthracyanines ca be synthesized from such compounds as 2,3-dimethylnaphthalene and 9,10-dicyanophenanthrene respectively.

For example, anthracyanines can be made from 2,3-dimethylnaphthalene by a multi-step procedure. The first step involves photolytic bromination of 2,3-dimethylnaphthalene to give $\alpha, \alpha, \alpha', \alpha'$-tetrabromo-2,3-dimethylnaphthalene.

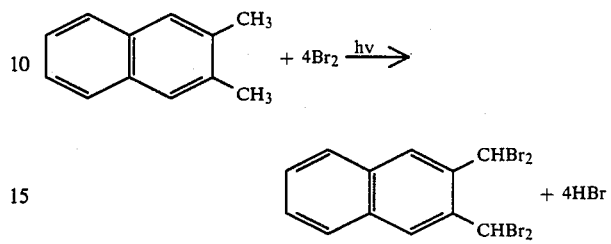

Reaction of the brominated intermediate with fumaronitrile in DMF with sodium iodide catalyst gives 2,3-dicyanoanthracene.

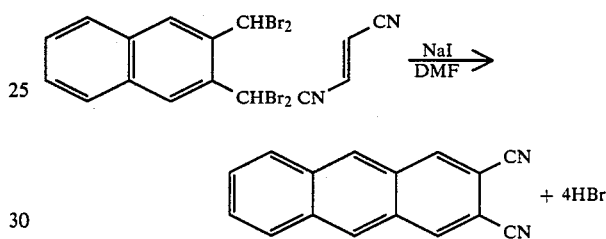

Heating 2,3-dicyanoanthracene in a suitable high boiling solvent can effect the direct conversion to anthracynanine.

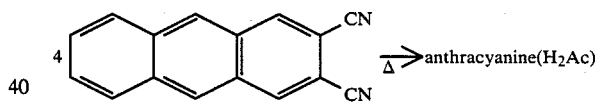

Better yields may be obtained by first reacting 2,3-dicyanoanthracene with ammonia t obtain an intermediate that is more readily converted to anthracyanine.

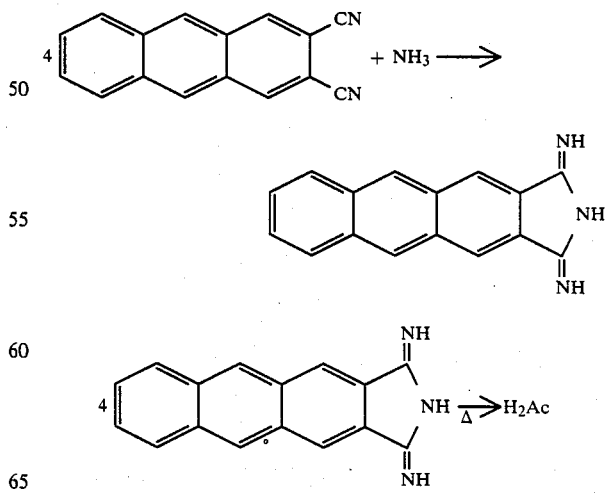

A central hetero atom may be incorporated into the macrocycle by an insertion reaction.

Alternatively, the macrocycle may be formed around the hetero atom template.

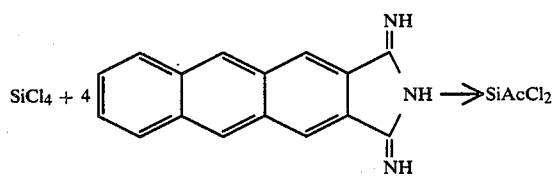

The compound 9,10-dicyanophenanthrene can be synthesized in a two-step procedure from benzoyl cyanide:

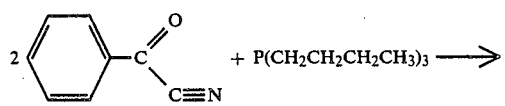

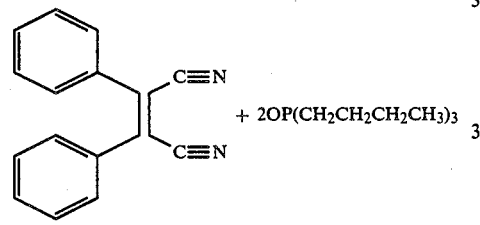

T. Mukaiyaka, I. Kuwajima, and K. Ohno, Bull Chem, Soc. Jpn 1965 38(11), 1954 report this synthesis. Tri-n-butylphosphine in ether is added to an ether solution of benzoyl cyanide. The product, α, α'-dicyanostilbene may be recrystallized from ethanol, yield 39%, mp. 160C.

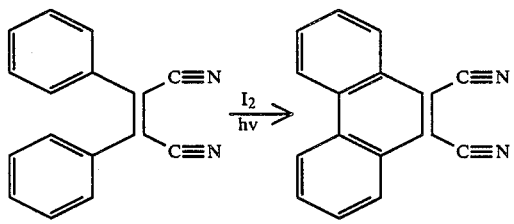

K. Ichimura and S. Watanabe, *Bull. Chem. Soc. Jpn*, 1976 49(8), p. 2224, describe the foregoing photolytic oxidativ Ⓡcoupling reaction to produce 9,10-dicyano-phenanthreen, mp. 290. 9,10dicyanophenanthrene can then be converted to phenanthracyanine by heating in a high boiling solvent.

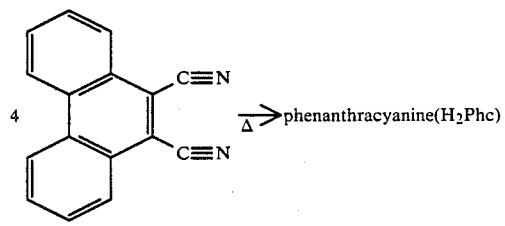

Alternatively, 9,10-dicyanophenanthrene can be reacted with ammonia to make an intermediate that is more easily converted to phenanthracyanine.

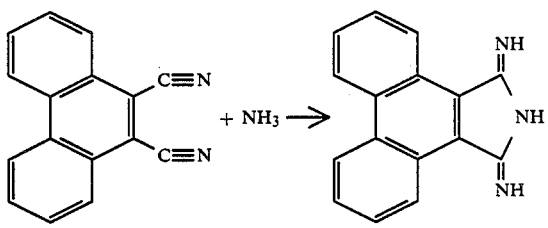

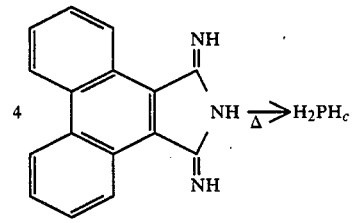

As with anthracyanine, above, a central hetero atom can be incorporated by either insertion into the preformed macrocycle, or by forming the macrocycle around the hetero atom.

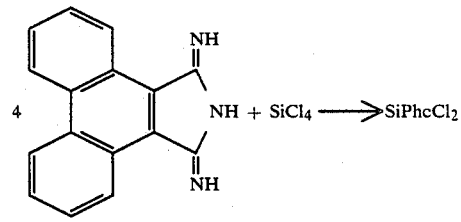

Both the anthracyanines and the phenanthracyanines are generally infusible, intractable materials. They have somewhat poor solubility in organic solvents suitable for spin coating thin films on rigid substrates. They are crystalline materials that are difficult to cast onto amorphous films with high reflectivity for optical data storage. Therefore, they are preferably functionalized with substituents that confer the desired properties for performance as an optical data storage medium. The functionality may confer one or any number of the following desirable properties: compatibility with a polymer binder, solubility in a spin coating solvent, result in the material with the ability to form amorphous thin films, control the wavelength for the absorption.

Organic substituents may be attached to the anthracyanine or phenanthracyanine ring via a suitable ring substitution reaction, e.g., chlorosulfonation. Reaction of the chlorosulfonated macrocycle with a primary or secondary amine

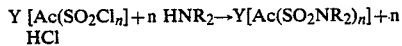

gives sulfonamide substituted materials. The sulfonamide groups confer desired solubility in organic solvents that allows spin coating of thin films.

An alternative means of controlling the properties of the anthracyanines and phenanthracyanines is to effect axial substitution on five or six coordinate central hetero atoms. For example, the axial positions of silicon anthracyanine can be substituted with alcoxide groups that confer the desired materials properties.

Of course, a combination of ring and axial substitution can be used to effect the desired physical properties.

The functionalized chromophores employed in the present invention can be readily cast as a coating on a substrate using conventional solvents and techniques. Generally, a binder is utilized in conjunction with the chromophore in order to form the recording layer. When a binder is used, it can be advantageously selected from any of a number of conventional polymer resins, e.g., dimer acid polyamides, vinylchloride resin, vinyl acetate resin, acrylic resin, methacrylic resin, polyester resin, nitrocellulose, polyethylene, polypropylene, polyamide, polystyrene, polycarbonate and epoxy resin.

In a preferred embodiment, however, the anthracyanines and phenanthracyanines are substituted with at least one substituent conferring film forming properties to the chromophore. Such a one-component material allows one to realize the excellent absorption properties of the chromophore, e.g., high extinction coefficient, while also realizing the benefits of the thermomechanical properties of a film forming material as a result of the film forming properties arising from the combination of the chromophore with the organic substituent. As well, since a single component material is used, the problem of dye/polymer phase separation is avoided. The result is an information layer exhibiting an excellent combination of absorption and thermomechanical properties, while allowing one to easily apply the material as a film.

The one-component material of the information layer thereby comprises two portions, i.e., the anthracyanine or phenanthracyanine chromophore portion and the film conferring organic substituents to the chromophore. Functionally, the lower limit of the amount of the chromophore portion is determined by the suitable optical absorption properties of the material as provided by the chromophore portion. The upper limit of the amount of chromophore portion suitable is determined by the desired thermomechanical properties exhibited by the material. Preferably, the chromophore portion, i.e., the primary anthracyanine or phenanthracyanine portion, comprises at least 25 percent by weight of the material.

The film conferring organic substituent of the chromophore which confers the desired thermomechanical properties to the one-component material is preferably a monomer or an oligomer, i.e., having from 2-100 monomer units, depending upon the molecular weight of the monomers chosen. In general, any precursor to a film-forming material may be suitable. The most preferred organic substituents, however, are comprised of ether, acid, amide, sulfonamide, ester, acrylate, epoxy, urethane, or silicone units, or mixtures thereof. The most preferred substituents are comprised of acid, amide, or ester units. As noted above, for the purposes of the present invention, the organic substituent can also include silicon.

The film conferring organic substituents of th chromophore can be substituted at a central hetero atom or any of the aromatic rings of the chromophore. When the chromophore is substituted by the film conferring organic substituent at a central hetero atom, it is preferred that the hetero atom be Si, Ge, Sn, a transition metal, Al, Ga or In. When the chromophore is substituted by the film conferring organic substituent at an aromatic ring, it is preferred that the hetero atom is an element of Group IIa, IIIb or IVb of the Periodic Table (see, F.A. Cotton and G. Wilkinson, Advanced Inorganic Chemistry, 4th Edition, John Wiley and Sons, 1980), or a transition metal. In any event, it is preferred that the central hetero atom, when employed, is silicon, germanium or tin, with silicon being the most preferred central hetero atom.

When the chromophore comprises two central hydrogen atoms or isotopes of hydrogen, of course, no substitution is possible at the central position of the chromophore. The isotopes of hydrogen would include deuterium and tritium. Chromophores having central hydrogen atoms are manufactured by first making the compound but with a central metal atom which is easily displaced. The metal is then replaced with the hydrogen atoms (or its isotopes) as is well known in the art.

The number of substitutions of the anthracyanine and phenanthracyanine chromophore can be any amount practicable, the determining factor being the ultimate performance of the one-component material as the recording layer in an optical recording medium. Generally, the number of substitutions is chosen so that the absorption maximum for the one-component material corresponds with the output wavelength of the laser used in the optical recording. The thermomechanical properties of the material should also allow data to be recorded on the recording layer by a focused laser beam operating above a threshold power value for writing data and at a useful data rate. The data can then be read by a focused, but lower power, laser beam that causes no detrimental change in the signal obtained from the recording layer. The excellent absorption characteristics of the recording layer material allow the data to be read by changes in reflectivity. The thermomechanical properties of the one-component material can also be controlled by the number (and type) of substitutions to allow laser addressed erasure of the data and to allow a film of the material to be cast by any technique known to those skilled in the art of coating. In general, therefore, the substituents of the chromophore are carefully designed so that the desired spectroscopic, thermomechanical and film-forming properties are combined into a one-component recording layer material.

The number of substituents that has generally been found to be most suitable for purposes of a recording layer are within the following guidelines, which can vary, however, depending upon the particular properties desired. When the chromophore is substituted with the film conferring organic substituent at a central hetero atom, the number of such substitutions is 1 or 2. When the chromophore is substituted with the film conferring organic substituent at an aromatic ring, the number of such substitutions is between 1 and about 16, with the most preferred number of substitutions being between about 4 and 8. A combination of the two types of substitutions can be had. No substitution at the central position is possible when hydrogen or its isotope occupies the central position.

The number of substituents off the central atom Y is generally determined by the nature of the central hetero atom, Y. The coordination geometry of Y can be octahedral, square pyramidal, or square planar, depending upon Y being six, five, or four coordinate. When the coordination geometry is octahedral, two Z substituents are present. Examples of octahedral geometry would include Y being Si, Ge, Sn and certain transition metals, e.g., Ti, Zr, Hf. When the square pyramidal structure is present, only one Z substituent is attached to Y. Examples of this geometry include Al, Ga, and In. Square planar geometry results in no Z substituents. Examples include cases where Y is selected from Group IIa of the Periodic Table and certain transition metals.

It is most preferred that Y is Si and that the film conferring substituents, whether off the aromatic ring or central group Y, are comprised of acid, amide or ester units.

The method of chemically linking the substituents to the chromophore aromatic rings or central atom can be any conventional method known to the skilled artisan. A mixture of substituents can be chosen to effect the desired properties.

The film formed by the one-component material of the present invention may be self-supporting, in which case any suitable or conventional casting technique may be used. Generally, however, it is preferred to cast the material as a film on a suitable support to add dimensional stability and support thereto. As well, the film may not always be self-supporting. The substrate may be optically featureless or may contain preformatting infrmation (e.g., tracking groove and/or encoded information in the form of readable marks.) It is important when coating a substrate, of course, that an extremely flat homogeneous information recording surface be obtained to preclude the scattering of light.

Any suitable coating technique may be used to achieve such a flat surface, with a conventional technique such as spin coating, which allows for a high degree of control of film thickness and flatness, being preferred. It is, of course, important that the one-component material form a thin film coating.

In general, the substrate which is coated with the recording layer of the present invention, whether it is the anthracyanine or phenanthracyanine one-component material or not, should possess a surface of suitable smoothness. This may be imparted by appropriate molding or other forming techniques when the substrate is made. If the substrate has an inadequately smooth surface, a smoothing or subbing polymer layer may be used to attain the appropriate smoothness. Such a smoothing or subbing layer should not, of course, interfere with application or utilization of the recording layer which is subsequently applied thereto. The subbing layer can contain preformatting information.

A suitable protective layer or cover, such as those known to the art, can also be used if desired to protect the recording layer from dirt, dust, scratches or abrasion.

In an illustrative recording system embodying the principles of the present invention, a record blank disk form may be subject to rotation at a constant linear or constant angular velocity while a beam of light from a light source, e.g., a laser, is focused on the information surface of the disk. The intensity of the light beam is controlled in accordance with the information to be recorded. Illustratively, the control is effected in accordance with carrier waves modulated in frequency by information containing signals, with the light beam intensity varying as a result between a high level sufficient to effect a detectable change in the physical characteristics of the absorptive recording layer material and a low level insufficient to effect such a detectable change, the frequency of the level alternations varying as the signal amplitude changes. Preferred writing speeds are in the range of from $10^6$ to $10^7$ bits per second.

The relative diameter and depth of the deformation formed will, of course, depend not only on the optical and thermal properties of the information layer, but also on the characteristics of the writing beam, i.e., focused spot diameter, depth of focus, intensity profile and intensity and duration of the writing pulse. Optimization of these parameters is familiar to those skilled in the art.

As a result of the deformation formation in the recording layer material, an information track comprising a succession of spaced deformations, such as pits, is formed in the information surface of the disk, the deformations appearing in those surface regions exposed to the high intensity beam. Variations in the length and separation of the deformations are representative of the recorded information.

The result of the above-described recording process is the formation of an information record of a form which facilitates recovery of the recorded information by optical playback processes. The information track of such an information record comprises (1) undisturbed surface regions alternating with (2) deformation regions formed by the deformation forming process, preferably coated on a substrate. This information track can be in either analog or digital form, for example, audio, video or computer data.

In playback or read operations pursuant to the principles of the present invention, a light beam is focused upon the information track of an information record. The playback beam has a constant intensity at a level insufficient to effect the formation of deformations in the information layer or erasure of the recorded information by levelling. A photodetector, positioned to receive light reflected from the successive regions of the information track as they pas through the path of the focused light, develops a signal representative of the recorded information.

Several variations in the playback or reading system as known to the art are possible. The most preferred mode of reading information involves the relative reflection between the recording layer material surface and those areas in which deformations have been formed in the recordation of information. When the reflectivity of the recording layer material surface is of relatively high reflectivity as compared to that of the substrate, the reflectivity in the areas of the deformation will be less than in the regions without deformations when a beam from the read laser passes thereby. Thus, a written bit can be registered as a decrease in reflected intensity. When the relative reflectivity of the recording layer material surface is low as compared to that of the substrate, however, the reflectivity in the areas of the pits will be more than in the regions without deformations when a beam from the read laser is focused thereon. Accordingly, a written bit can be registered as an increase in reflected intensity.

An advantage of the present invention is that the resulting information medium can also be suitable for erasure. Complete and accurate erasure of recorded information can be readily carried out by heating the medium to a sufficiently high temperature such that the recording layer material becomes softened sufficiently to allow levelling of the surface. This can be done globally by heating the entire disk in an oven or some other suitable heating means, or by means of a defocused laser beam whose intensity at the surface of the information layer is intermediate between that of the write beam and read beam. It is generally necessary to heat an area greater than that of a single bit (typically 1 μm in diameter).

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. An optical information storage medium comprising an information recording layer which is a smooth, optical quality light absorptive layer in which detectable changes can be induced when using a laser upon the surface of the layer, wherein the information recording layer comprises an anthracyanine or phenanthracyanine chromophore.

2. The optical information storage medium of claim 1, wherein the recording layer further comprises a resin binder.

3. The optical information storage medium of claim 2, wherein the resin binder is a dimer acid polyamide.

4. The optical information storage medium of claim 1, wherein the anthracyanine or phenanthracyanin chromophore is substituted with at least one substituent conferring film forming properties.

5. The optical information storage medium of claim 4, wherein the film conferring organic substituent is a monomer or an oligomer.

6. The optical information storage medium of claim 5, wherein the film conferring organic substituent contains at least one functional unit selected from the group consisting of ether, acid, amide, ester, sulfonamide, acrylate, epoxy, urethane and silicone units, and mixtures thereof.

7. The optical information sotrage medium of claim 6, wherein the film conferring organic substituent contains at least one functional unit selected from the group consisting of acid, amide and ester units and mixtures thereof.

8. The optical information storage medium of claim 5, wherein the chromophore contains a central hetero atom and the hetero atom is Si, Ge, Sn, a transition metal, Al, Ga or In, with the chromophore being substituted at the hetero atom.

9. The optical information storage medium of claim 8, wherein the hetero atom is Si, Ge or Sn.

10. The optical information storage medium of claim 5, wherein the chromophore contains a central hetero atom and the hetero atom is an element of Group IIa, IIIb or IVb of the Periodic Table or a transition metal, with the chromophore being substituted at an aromatic ring.

11. The optical information storage medium of claim 1, wherein the recording medium comprises a thermally stable substrate.

12. The optical information storage medium of claim 1, wherein the medium is in the form of a disk.

13. A readable information medium comprising a relatively thick and thermally stable substrate and having coated thereon a layer comprising an information track comprised of a succession of spaced deformations, said layer being comprised of an anthracyanine or phenanthracyaine chromophore.

14. The information medium of claim 13, wherein the layer further compris®s a resin binder, and said resin binder is a dimer acid polyamide.

15. The information medium of claim 13, wherein the medium is in the form of a disk.

16. An erasable information medium comprising a relatively thick and thermally stable substrate having coated thereon a layer comprised of an anthracyanine or phenanthracyanine chromophore.

17. The information medium of claim 16, wherein the layer further comprises a resin binder.

18. The information medium of claim 17, wherein the resin binder is dimer acid polyamide.

19. A method of recording information in a thin film deposited on a relatively thick substrate by irradiating the film with a laser beam in accordance with said information to form deformations in the film, the improvement which comprises said film being comprised of an anthracyanine or phenanthracyanine chromophore.

20. A method of erasing a deformation information pattern of an information medium, which deformation patter is formed in a film deposited on a substrate and with said erasing being achieved by heating or imparting energy to said film, the improvement which comprises said film being comprised of an anthracyanine or phenanthracyanine chromophore.

21. An optical information storage medium comprising an information recording layer, wherein the information recording layer comprises an anthracyanine or phenanthracyanine chromophore which contains a silicon central hetero atom.

22. The optical information storage medium of claim 21, wherein the recording medium comprises a thermally stable substrate.

23. The optical information storage medium of claim 21, wherein the medium is in the form of a disk.

24. The optical information storage medium of claim 21, wherein the anthracyanine or phenanthracyanine chromophore is substituted with at least one substituent conferring film forming properties.

25. The optical information storage medium of claim 24, wherein the film conferring organic substituent contains at least one functional unit selected form the group consisting of ether, acid, amide, ester, sulfonamide, acrylate, epoxy, urethane, and silicone units, and mixtures thereof.

26. The optical information storage medium of claim 25, wherein the film conferring organic substituent contains at least one functional unit selected form the group consisting of acid, amide and ester units, and mixtures thereof.

27. A readable information medium comprising a relatively thick and thermally stable substrate having coated thereon a layer comprising an information track comprised of a succession of spaced deformations, said layer being comprised of an anthracyanine or phenanthracyanine chromophore substituted with at least one organic substituent conferring film forming properties.

28. The information medium of claim 27, wherein the film conferring organic substituent is a monomer or an oligomer.

29. The information medium of claim 28, wherein the film conferring organic substituent contains at least one functional unit selected from the group consisting of ether, acid, amide, ester, sulfonamide, acrylate, epoxy, urethane and silicone units, and mixtures thereof.

30. The information medium of claim 29, wherein the film conferring organic substituent contains at leasta one functional unit selected from the group consisting of acid, amide, and ester units, and mixtures thereof.

31. An erasable medium comprising a relatively thick and thermally stable substrate having coated thereon a layer comprised of an anthracyanine or phenathracyanine chromophore substituted with at least one organic substituted conferring film forming properties.

32. The information medium of claim 31, wherein the film conferring organic substituent is a monomer or an oligomer.

33. The information medium of claim 32, wherein the film conferring organic substituent contains at least one functional unit selected from the group consisting of ether, acid, amide, ester, sulfonamide, acrylate, epoxy, urethane and silicone units, and mixtures thereof.

34. The information medium of claim 33, wherein the film conferring organic substituent contains at least one functional unit selected form the group consisting of acid, amide, and ester units, and mixtures thereof.

* * * * *